United States Patent
Kimmel et al.

(10) Patent No.: US 8,996,535 B1
(45) Date of Patent: Mar. 31, 2015

(54) EXTENT HASHING TECHNIQUE FOR DISTRIBUTED STORAGE ARCHITECTURE

(71) Applicant: NetApp, Inc., Sunnyvale, CA (US)

(72) Inventors: Jeffrey S. Kimmel, Chapel Hill, NC (US); Blake H. Lewis, Los Altos Hills, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 14/160,048

(22) Filed: Jan. 21, 2014

Related U.S. Application Data

(63) Continuation of application No. 14/044,624, filed on Oct. 2, 2013.

(51) Int. Cl.
  *G06F 7/00* (2006.01)
  *G06F 17/30* (2006.01)

(52) U.S. Cl.
  CPC ................... *G06F 17/3033* (2013.01)
  USPC ........................................................ 707/747

(58) Field of Classification Search
  USPC ........................................................ 707/747
  See application file for complete search history.

(56) References Cited

U.S. PATENT DOCUMENTS

| | | | |
|---|---|---|---|
| 5,937,425 A | 8/1999 | Ban | |
| 7,249,150 B1 | 7/2007 | Watanabe et al. | |
| 7,680,837 B2 | 3/2010 | Yamato | |
| 7,996,636 B1 | 8/2011 | Prakash et al. | |
| 8,082,390 B1 | 12/2011 | Fan et al. | |
| 8,099,396 B1 | 1/2012 | Novick et al. | |
| 8,205,065 B2 | 6/2012 | Matze | |
| 8,341,457 B2 | 12/2012 | Spry et al. | |
| 8,417,987 B1 | 4/2013 | Goel et al. | |
| 8,495,417 B2 | 7/2013 | Jernigan, IV et al. | |
| 8,539,008 B2 | 9/2013 | Faith et al. | |
| 8,560,879 B1 | 10/2013 | Goel | |
| 8,595,595 B1 | 11/2013 | Grcanac et al. | |
| 2002/0073068 A1 | 6/2002 | Guha | |
| 2003/0120869 A1 | 6/2003 | Lee et al. | |
| 2004/0052254 A1* | 3/2004 | Hooper | 370/392 |
| 2005/0144514 A1 | 6/2005 | Ulrich et al. | |
| 2007/0061572 A1* | 3/2007 | Imai et al. | 713/169 |
| 2007/0143359 A1* | 6/2007 | Uppala | 707/202 |

(Continued)

OTHER PUBLICATIONS

Cornwall, Michael, "Anatomy of a Solid-state Drive," ACM Queue—Networks, vol. 10, No. 10, Oct. 2012, pp. 1-7.

(Continued)

*Primary Examiner* — Hosain Alam
*Assistant Examiner* — Van Oberly
(74) *Attorney, Agent, or Firm* — Cesari and McKenna, LLP

(57) ABSTRACT

In one embodiment, an extent hashing technique is used to efficiently distribute data and associated metadata substantially evenly among nodes of a cluster. The data may be write data associated with a write request issued by a host and received at a node of the cluster. The write data may be organized into one or more extents. A hash function may be applied to the extent to generate a result which may be truncated or trimmed to generate a hash value. A hash space of the hash value may be divided into a plurality of buckets representative of the write data, i.e., the extents, and the associated metadata, i.e., extent metadata. A number of buckets may be assigned to each extent store instance of the nodes to distribute ownership of the buckets, along with their extents and extent metadata, across all of the extent store instances of the nodes.

19 Claims, 9 Drawing Sheets

(56) References Cited

U.S. PATENT DOCUMENTS

| | | | |
|---|---|---|---|
| 2009/0271412 A1* | 10/2009 | Lacapra et al. | 707/10 |
| 2010/0042790 A1 | 2/2010 | Mondal et al. | |
| 2010/0088296 A1 | 4/2010 | Periyagaram et al. | |
| 2011/0035548 A1 | 2/2011 | Kimmel et al. | |
| 2011/0060876 A1 | 3/2011 | Liu | |
| 2011/0191389 A1 | 8/2011 | Okamoto | |
| 2011/0213928 A1 | 9/2011 | Grube et al. | |
| 2012/0143877 A1* | 6/2012 | Kumar et al. | 707/747 |
| 2012/0290788 A1 | 11/2012 | Klemm et al. | |
| 2013/0018854 A1 | 1/2013 | Condict | |
| 2013/0138862 A1 | 5/2013 | Motwani et al. | |
| 2013/0238832 A1 | 9/2013 | Dronamraju et al. | |
| 2013/0238932 A1 | 9/2013 | Resch | |
| 2013/0268497 A1 | 10/2013 | Baldwin et al. | |
| 2013/0275656 A1* | 10/2013 | Talagala et al. | 711/103 |
| 2013/0346810 A1 | 12/2013 | Kimmel et al. | |

OTHER PUBLICATIONS

"Cuckoo hashing," Wikipedia, http://en.wikipedia.org/wiki/Cuckoo_hash, Apr. 2013, pp. 1-5.
Culik, K., et al., "Dense Multiway Trees," ACM Transactions on Database Systems, vol. 6, Issue 3, Sep. 1981, pp. 486-512.
Debnath, Biplob, et al., "FlashStore:.High Throughput Persistent Key-Value Store," Proceedings of the VLDB Endowment VLDB Endowment, vol. 3, Issue 1-2, Sep. 2010, pp. 1414-1425.
Gal, Eran et al., "Algorithms and Data Structures for Flash Memories," ACM Computing Surveys, vol. 37, No. 2, Jun. 2005, pp. 138-163.
Gray, Jim et al., "Flash Disk Opportunity for Server Applications," Queue—Enterprise Flash Storage, vol. 6, Issue 4, Jul.-Aug. 2008, pp. 18-23.
Handy, Jim, "SSSI Tech Notes: How Controllers Maximize SSD Life," SNIA, Jan. 2013, pp. 1-20.
Leventhal, Adam H. "A File System All Its Own," Communications of the ACM Queue, vol. 56, No. 5, May 2013, pp. 64-67.
Lim, H. et al., "SILT: A Memory-Efficient, High-Performance Key-Value Store," Proceedings of the $23^{rd}$ ACM Symposium on Operating Systems Principles (SOSP'11), Oct. 23-26, 2011, pp. 1-13.
Moshayedi, Mark, et al., "Enterprise SSDs," ACM Queue—Enterprise Flash Storage, vol. 6 No. 4, Jul.-Aug. 2008, pp. 32-39.
Pagh, Rasmus, et al., "Cuckoo Hashing," Elsevier Science, Dec. 8, 2003, pp. 1-27.
Pagh, Rasmus, "Cuckoo Hashing for Undergraduates," IT University of Copenhagen, Mar. 27, 2006, pp. 1-6.
Rosenblum, Mendel, et al., "The Design and Implementation of a Log-Structured File System," Proceedings of the $13^{th}$ ACM Symposium on Operating Systems Principles, Jul. 24, 1991, pp. 1-15.
Rosenblum, Mendel, et al., "The LFS Storage Manager," Summer '90 USENIX Technical Conference, Anaheim, California, Jun. 1990, pp. 1-16.
Rosenblum, Mendel, "The Design and Implementation of a Log-structured File System," UC Berkeley, Thesis, 1992, pp. 1-101.
Seltzer, Margo, et al., "An Implementation of a Log Structured File System for UNIX," Winter USENIX, San Diego, CA, Jan. 25-29, 1993, pp. 1-18.
Seltzer, Margo, et al., "File System Performance and Transaction Support," UC Berkeley, Thesis, 1992, pp. 1-131.
Smith, Kent, "Garbage Collection," SandForce, Flash Memory Summit, Santa Clara, CA, Aug. 2011, pp. 1-9.
Twigg, Andy, et al., "Stratified B-trees and Versioned Dictionaries," Proceedings of the 3rd USENIX Conference on Hot Topics in Storage and File Systems, vol. 11, 2011, pp. 1-5.
Wu, Po-Liang, et al., "A File-System-Aware FTL Design for Flash-Memory Storage Systems," Design, Automation & Test in Europe Conference & Exhibition, IEEE, 2009, pp. 1-6.
"Notification of Transmittal of the International Search Report and the Written Opinion of the International Searching Authority, or the Declaration", PCT Application No. PCT/US2014/058728, issued by the European Patent Office, Dec. 16, 2014, 11 pages.

* cited by examiner

EXTENT HASHING TECHNIQUE FOR DISTRIBUTED STORAGE ARCHITECTURE

RELATED APPLICATION

The present application is a continuation of U.S. patent application Ser. No. 14/044,624, entitled "Extent Hashing Technique for Distributed Storage", filed on Oct. 2, 2013 by Jeffrey S. Kimmel et al., the contents of which are incorporated by reference herein in their entirety.

BACKGROUND

1. Technical Field

The present disclosure relates to storage systems and, more specifically, to efficient distribution of data, including metadata, among storage systems configured to provide a distributed storage architecture of a cluster.

2. Background Information

A storage system typically includes one or more storage devices, such as solid state drives (SSDs), into which information may be entered, and from which information may be obtained, as desired. The storage system may logically organize the information stored on the devices as storage containers, such as files or logical units (LUNs). Each storage container may be implemented as a set of data structures, such as data blocks that store data for the storage containers and metadata blocks that describe the data of the storage containers. For example, the metadata may describe, e.g., identify, storage locations on the devices for the data.

A plurality of storage systems may be interconnected as a cluster and configured to provide storage services relating to the organization of the storage containers stored on the storage devices. The storage system cluster may be further configured to operate according to a client/server model of information delivery to thereby allow many clients or hosts to access the storage containers. Yet often a large number of data access requests issued by one or more hosts may be directed to storage containers serviced by a particular storage system of the cluster. As a result, the storage system attempting to service the requests directed to the storage containers may exceed its processing and storage resources to become overburdened, with a concomitant degradation of speed and performance.

Thus, to ensure fast and efficient access to data and associated metadata in a cluster of storage systems, it is desirable to leverage the storage and processing resources of the cluster by enabling all of the storage systems to serve, i.e., store and process, the data and metadata. Leveraging of such resources enables scale-out throughout the cluster, as well as reduction of processing load on the storage systems of the cluster, i.e. the processing load and storage consumption are distributed throughout the cluster.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DESCRIPTION OF ILLUSTRATIVE EMBODIMENTS

The embodiments described herein provide an extent hashing technique that is used to efficiently distribute data and associated metadata substantially evenly among storage systems embodied as nodes of a cluster. In an embodiment, the data may be write data associated with one or more write requests issued by a host and received at a node of the cluster. The write data may be organized, e.g. aggregated, into one or more variable length blocks or extents. A random technique, such as a hash function, may be applied to each extent to generate a result, which may be truncated or trimmed to generate a hash value. A hash space of the hash value may be divided into a plurality of buckets representative of the write data, i.e., the extents, and the associated metadata, i.e., extent metadata. The buckets may be assigned to extent store instances based on capacity and resource utilization. In another embodiment, a substantially equal number of buckets may be assigned to each extent store instance (e.g., where the extent store instances have similar capacity and performance) in the cluster to thereby distribute ownership of the buckets (along with their extents and extent metadata) substantially evenly, i.e., approximately uniformly, across all of the extent store instances. Notably, the distribution of extents and extent metadata may occur both among the nodes, i.e., between extent store instances on different nodes, and within each extent store instance. Advantageously, the extent hashing technique provides a foundation for fine-grain scale out and de-duplication in the cluster.

Description

Storage Cluster

Figure 1:
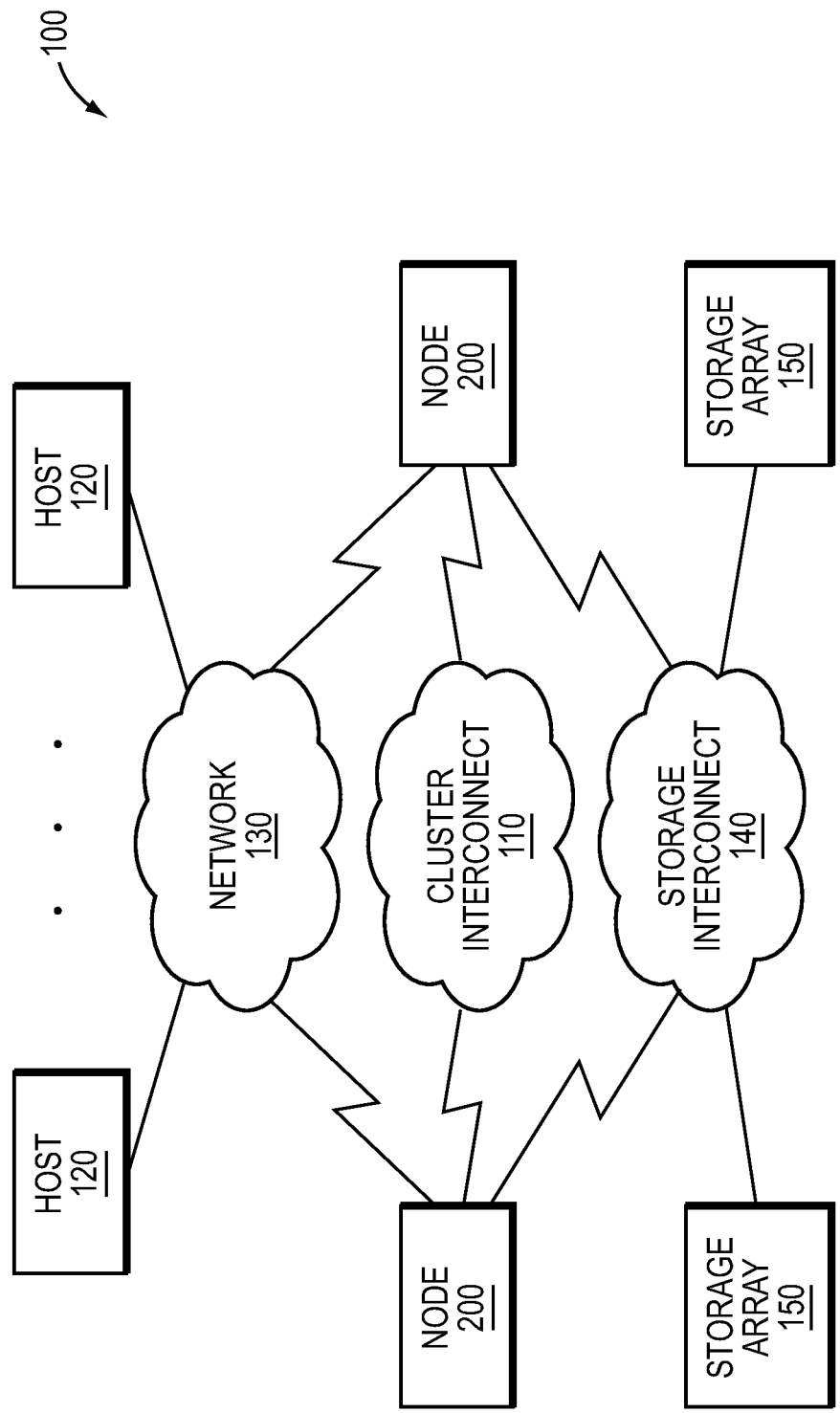
FIG. 1 is a block diagram of a plurality of nodes interconnected as a cluster.

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container stored on the cluster 100.

Figure 2:
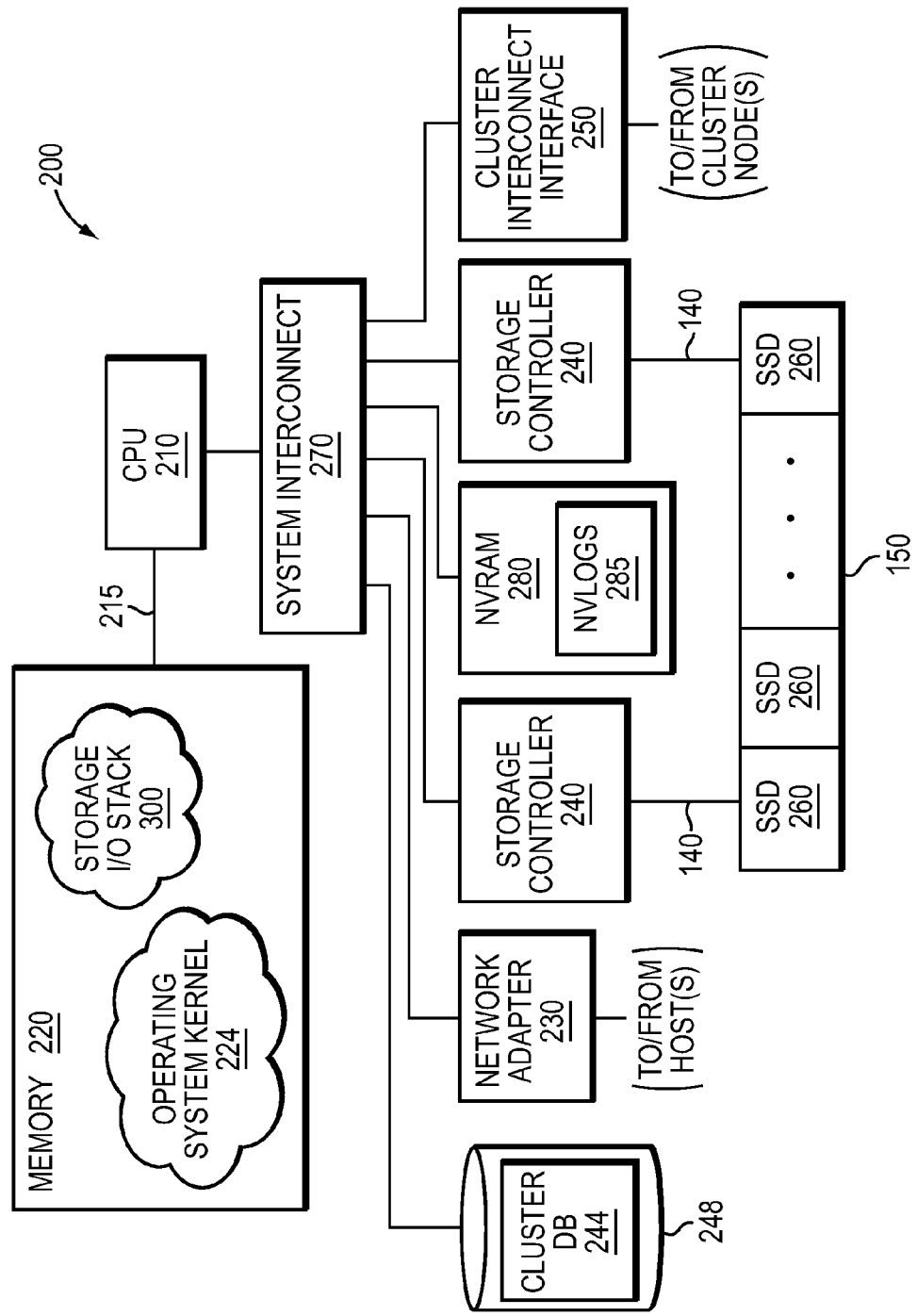
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, storage controllers 240, a cluster interconnect interface 250 and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a shared local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements may be used, such as a serial ATA (SATA) topology or a PCI topology. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as Infiniband, may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
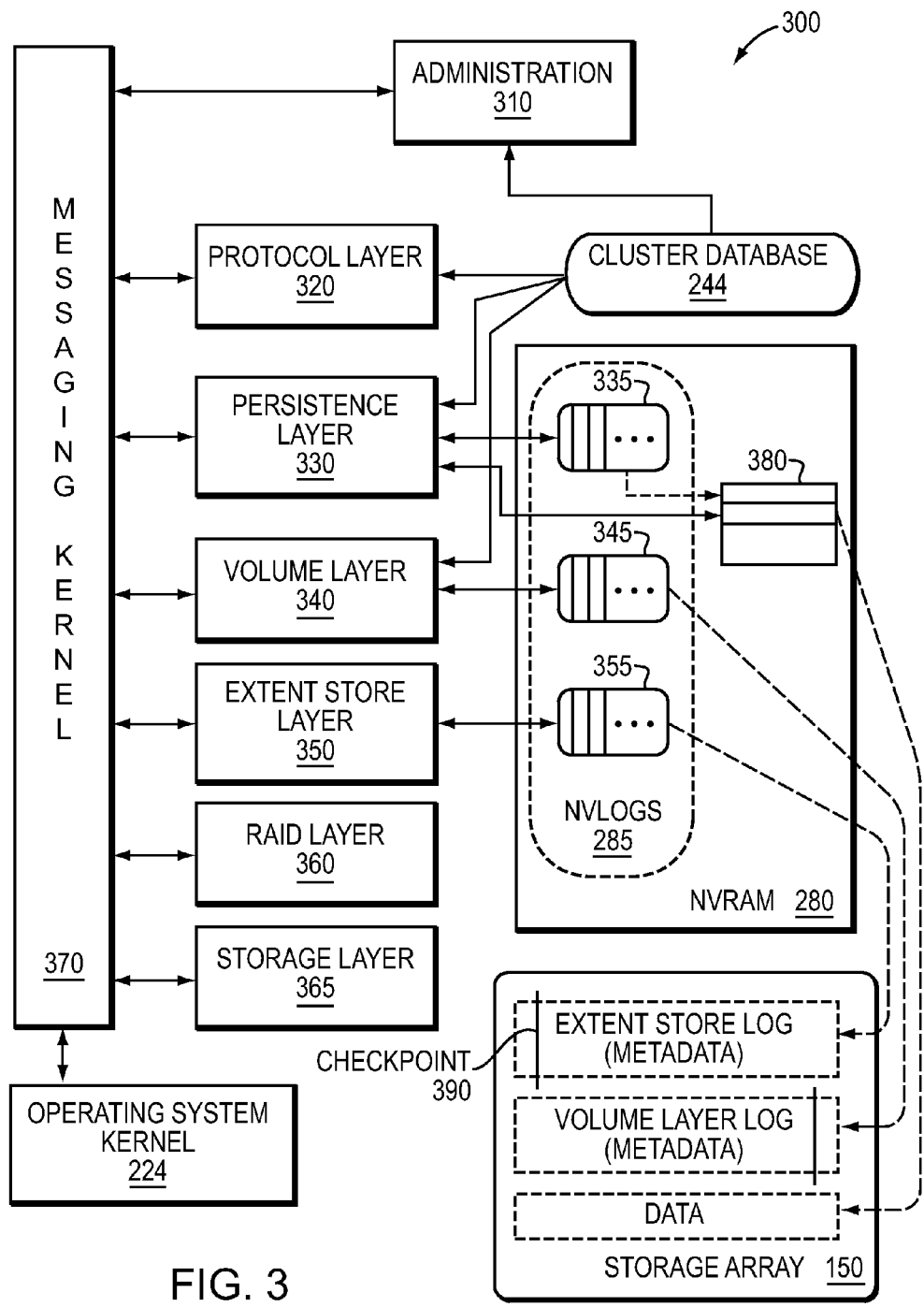
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism, and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 380 illustratively embodied as a log whose contents can be replaced randomly, e.g., under some random access replacement policy rather than only in serial fashion, and returns an acknowledgement to the host 120 via the protocol layer 320. In an embodiment only I/O requests that modify the LUN (e.g., write requests) are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. In an embodiment, the write-back cache may be structured as a log. Notably, the write data for the write request may be physically stored in the cache 380 such that the log 335 contains the reference to the associated write data. It will be understood to persons skilled in the art that other variations of data structures may be used to store or maintain the write data in NVRAM including data structures with no logs. In an embodiment, a copy of the write-back cache may be also maintained in the memory 220 to facilitate direct memory access to the storage controllers. In other embodiments, caching may be performed at the host 120 or at a receiving node in accordance with a protocol that maintains coherency between the data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request, as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., offsets) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the administration layer 310 provides distribution of extents among the storage containers. As described further herein, an extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas the retirement of log entries ensures that the entries accumulated in the volume layer log 345 synchronize with the metadata checkpoints committed to the storage array 150 by, e.g., retiring those accumulated log entries prior to the checkpoint. In one or more embodiments, the checkpoint and retirement of log entries may be data driven, periodic or both.

In an embodiment, the extent store layer 350 is responsible for storing extents on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoint with incremental changes recorded in one or more log files) in which selected in-core mappings (less than the total) are committed to the array 150 at various intervals (e.g., driven by an amount of change to the in-core mappings, size thresholds of log 355, or periodically). Notably, the accumulated entries in log 355 may be retired once all in-core mappings have been committed to include the changes recorded in those entries.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth), e.g., in accordance with a plurality of contiguous range write operations, so as to reduce data relocation (i.e., internal flash block management) that may occur within the SSDs as a result of the operations. In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
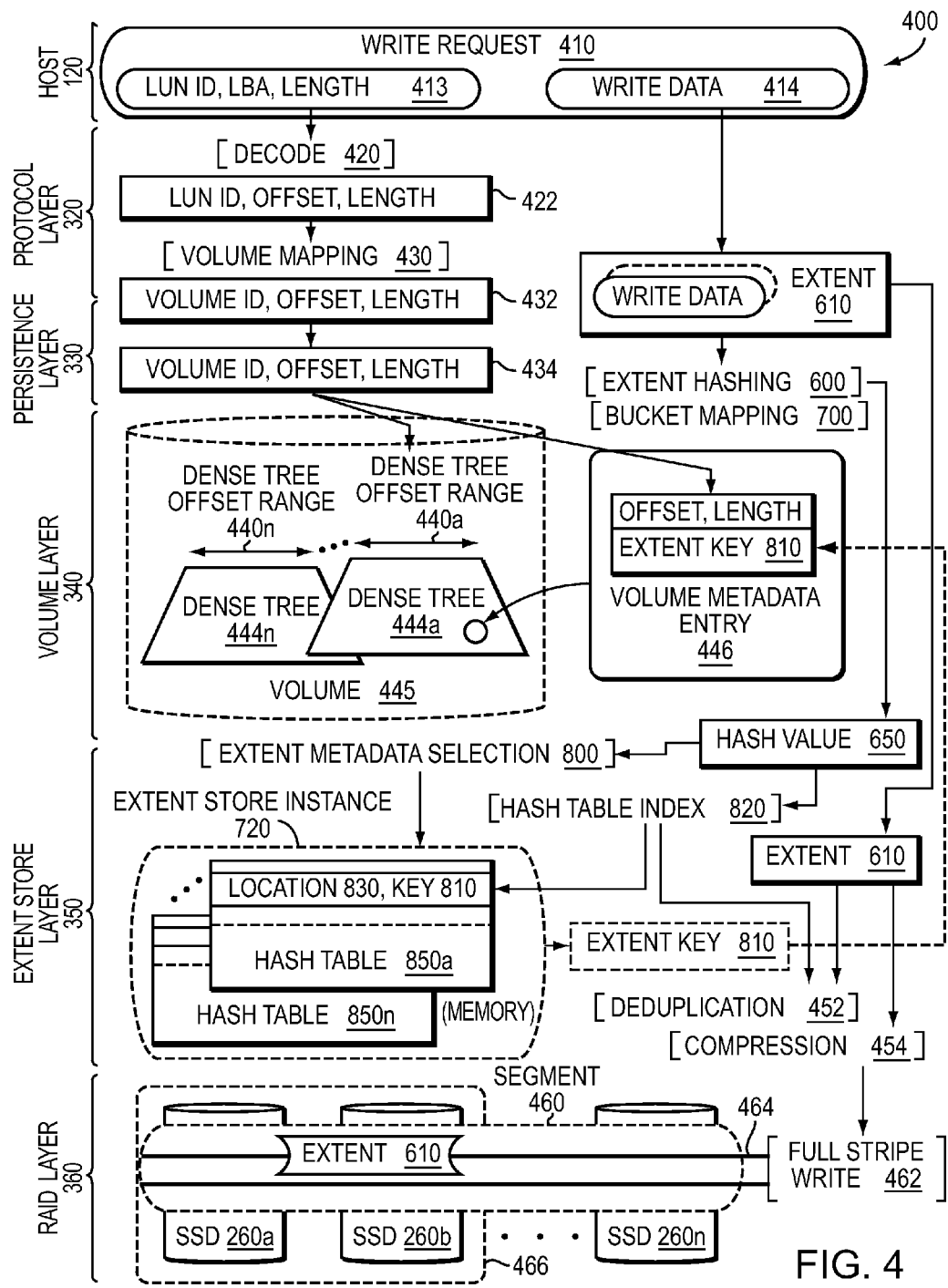
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage arrays 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer 320 may also implement a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistence layer log 335 and returns an acknowledgement to the host 120 via the protocol layer 320. As described herein, the persistence layer 330 may aggregate and organize write data 414 from one or more write requests into a new extent 610 and perform a hash computation, i.e., a hash function, on the new extent to generate a hash value 650 in accordance with an extent hashing technique 600.

The persistence layer 330 may then pass the write request with aggregated write data including, e.g., the volume ID, offset and length, as parameters 434 to the appropriate volume layer instance. In an embodiment, message passing of the parameters 432 (received by the persistence layer) may be redirected to another node via the function shipping mechanism, e.g., RPC, for inter-node communication. Alternatively, message passing of the parameters 434 may be via the IPC mechanism, e.g., message threads, for intra-node communication.

In one or more embodiments, a bucket mapping technique 700 is provided that translates the hash value 650 to an instance 720 of an appropriate extent store layer (i.e., extent store instance 720) that is responsible for storing the new extent 610. Note, the bucket mapping technique may be implemented in any layer of the storage I/O stack above the extent store layer. In an embodiment, for example, the bucket mapping technique may be implemented in the persistence layer 330, the volume layer 340, or a layer that manages cluster-wide information, such as a cluster layer (not shown) Accordingly, the persistence layer 330, the volume layer 340, or the cluster layer may contain computer executable instructions executed by the CPU 210 to perform operations that implement the bucket mapping technique 700 described herein. The persistence layer 330 may then pass the hash value 650 and the new extent 610 to the appropriate volume layer instance and onto the appropriate extent store instance via an extent store put operation. As described further herein, the extent hashing technique 600 may embody an approximately uniform hash function to ensure that any random extent to be written may have an approximately equal chance of falling into any extent store instance 720, i.e., hash buckets are distributed across extent store instances of the cluster 100 based on available resources. As a result, the bucket mapping technique 700 provides load-balancing of write operations (and, by symmetry, read operations) across nodes 200 of the cluster, while also leveling flash wear in the SSDs 260 of the cluster.

In response to the put operation, the extent store instance may process the hash value 650 to perform an extent metadata selection technique 800 that (i) selects an appropriate hash table 850 (e.g., hash table 850*a*) from a set of hash tables (illustratively in-core) within the extent store instance 720, and (ii) extracts a hash table index 820 from the hash value 650 to index into the selected hash table and lookup a table entry having an extent key 810 identifying a storage location 830 on SSD 260 for the extent. Accordingly, the extent store layer 350 contains computer executable instructions executed by the CPU 210 to perform operations that implement the extent metadata selection technique 800 described herein. If a table entry with a matching extent key is found, then the SSD location 830 mapped from the extent key 810 is used to retrieve an existing extent (not shown) from SSD. The existing extent is then compared with the new extent 610 to determine whether their data is identical. If the data is identical, the new extent 610 is already stored on SSD 260 and a de-duplication opportunity (denoted de-duplication 452) exists such that there is no need to write another copy of the data. Accordingly, a reference count in the table entry for the existing extent is incremented and the extent key 810 of the existing extent is passed to the appropriate volume layer instance for storage within an entry (denoted as volume metadata entry 446) of a dense tree metadata structure 444 (e.g., dense tree 444*a*), such that the extent key 810 is associated an offset range 440 (e.g., offset range 440*a*) of the volume 445.

However, if the data of the existing extent is not identical to the data of the new extent 610, a collision occurs and a deterministic algorithm is invoked to sequentially generate as many new candidate extent keys (not shown) mapping to the same bucket as needed to either provide de-duplication 452 or to produce an extent key that is not already stored within the extent store instance. Notably, another hash table (e.g. hash table 850*n*) may be selected by a new candidate extent key in accordance with the extent metadata selection technique 800. In the event that no de-duplication opportunity exists (i.e., the extent is not already stored) the new extent 610 is compressed in accordance with compression technique 454 and passed to the RAID layer 360, which processes the new extent 610 for storage on SSD 260 within one or more stripes 464 of RAID group 466. The extent store instance may cooperate with the RAID layer 360 to identify a storage segment 460 (i.e., a portion of the storage array 150) and a location on SSD 260 within the segment 460 in which to store the new extent 610. Illustratively, the identified storage segment is a segment with a large contiguous free space having, e.g., location 830 on SSD 260b for storing the extent 610.

In an embodiment, the RAID layer 360 then writes the stripes 464 across the RAID group 466, illustratively as a full write stripe 462. The RAID layer 360 may write a series of stripes 464 of sufficient depth to reduce data relocation that may occur within flash-based SSDs 260 (i.e., flash block management). The extent store instance then (i) loads the SSD location 830 of the new extent 610 into the selected hash table 850n (i.e., as selected by the new candidate extent key), (ii) passes a new extent key (denoted as extent key 810) to the appropriate volume layer instance for storage within an entry (also denoted as volume metadata entry 446) of a dense tree 444 managed by that volume layer instance, and (iii) records a change to extent metadata of the selected hash table in the extent store layer log 355. Illustratively, the volume layer instance selects dense tree 444a spanning an offset range 440a of the volume 445 that encompasses the offset range of the write request. As noted, the volume 445 (e.g., an offset space of the volume) is partitioned into multiple regions (e.g., allotted as disjoint offset ranges); in an embodiment, each region is represented by a dense tree 444. The volume layer instance then inserts the volume metadata entry 446 into the dense tree 444a and records a change corresponding to the volume metadata entry in the volume layer log 345. Accordingly, the I/O (write) request is sufficiently stored on SSD 260 of the cluster.

Read Path

Figure 5:
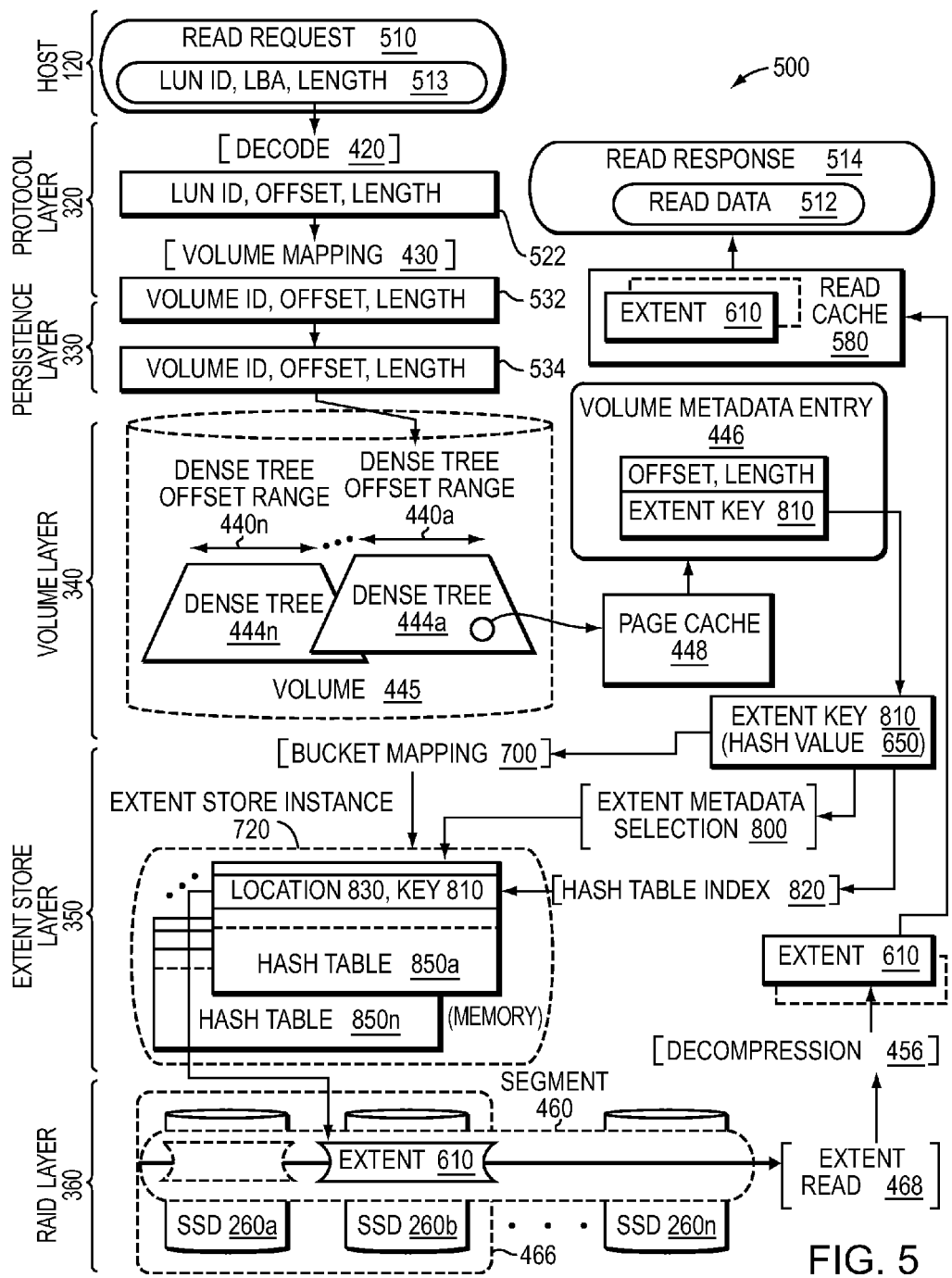
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the decoded results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write cache 380 to determine whether some or all of the read request can be serviced from its cached data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism (e.g., RPC, for inter-node communication) or the IPC mechanism (e.g., message threads, for intra-node communication).

The volume layer instance may process the read request to access a dense tree metadata structure 444 (e.g., dense tree 444a) associated with a region (e.g., offset range 440a) of a volume 445 that encompasses the requested offset range (specified by parameters 534). The volume layer instance may further process the read request to search for (lookup) one or more volume metadata entries 446 of the dense tree 444a to obtain one or more extent keys 810 associated with one or more extents 610 (or portions of extents) within the requested offset range. In an embodiment, each dense tree 444 may be embodied as a multiple levels of a search structure with possibly overlapping offset range entries at each level. The various levels of the dense tree may have volume metadata entries 446 for the same offset, in which case, the higher level has the newer entry and is used to service the read request. A top level of the dense tree 444 is illustratively resident in-core and a page cache 448 may be used to access lower levels of the tree. If the requested range or portion thereof is not present in the top level, a metadata page associated with an index entry at the next lower tree level (not shown) is accessed. The metadata page (i.e., in the page cache 448) at the next level is then searched to find any overlapping entries. This process is then iterated until a volume metadata entry 446 of a level is found to ensure that the extent key(s) 810 for the entire requested read range are found.

Once found, each extent key 810 is processed by the volume layer 340 to, e.g., implement the bucket mapping technique 700 that translates the extent key to an appropriate extent store instance 720 responsible for storing the requested extent 610. Note that, in an embodiment, each extent key 810 may be substantially identical to the hash value 650 associated with the extent 610, i.e., the hash value as calculated during the write request for the extent, such that the bucket mapping 700 and extent metadata selection 800 techniques may be used for both write and read path operations. Note also that the extent key 810 may be derived from the hash value 650. The volume layer 340 may then pass the extent key 810 (i.e., the hash value from a previous write request for the extent) to the appropriate extent store instance 720 (via an extent store get operation), which performs an extent key-to-SSD mapping to determine the location on SSD 260 for the extent.

In response to the get operation, the extent store instance may process the extent key 810 (i.e., hash value 650) to perform the extent metadata selection technique 800 that (i) selects an appropriate hash table 850 (e.g., hash table 850a) from a set of hash tables within the extent store instance 720, and (ii) extracts a hash table index 820 from the extent key 810 (i.e., hash value 650) to index into the selected hash table and lookup a table entry having a matching extent key 810 that identifies a storage location 830 on SSD 260 for the extent 610. That is, the SSD location 830 mapped to the extent key 810 may be used to retrieve the existing extent (denoted as extent 610) from SSD 260 (e.g., SSD 260b). The extent store instance then cooperates with the RAID layer 360 to access the extent on SSD 260b and retrieve the data contents in accordance with the read request. Illustratively, the RAID layer 360 may read the extent in accordance with an extent read operation 468 and pass the extent 610 to the extent store instance. The extent store instance may then decompress the extent 610 in accordance with a decompression technique 456, although it will be understood to those skilled in the art that decompression can be performed at any layer of the storage I/O stack 300. The extent 610 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Extent Hash Structure

Figure 6:
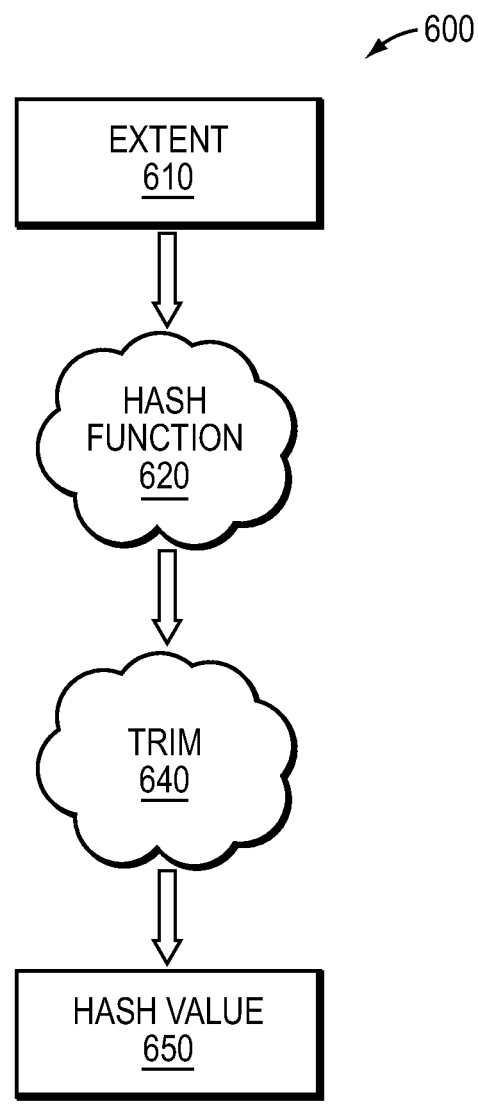
FIG. 6 is a block diagram of an extent hashing technique.

FIG. 6 is a block diagram of the extent hashing technique 600 that may be advantageously used with one or more embodiments described herein. As noted, the persistence layer 330 may organize the write data of one or more write requests into one or more extents 610, each of which is embodied as a variable length block. The length of the extent may vary between 1 byte and 64 KB (or larger) although, e.g., the extent is typically 4 KB or more in length. The extent 610 is illustratively a logically contiguous portion of a LUN (or file) that is stored physically contiguous on SSD 260 within a node of the cluster so that, e.g., it can be read from the SSD in a single read operation. Thus, extents aggregated from multiple I/O requests may form contiguous LBA ranges within any LUN. Accordingly, multiple LUNs (and/or files) may share the same extent at different addresses (so long as logically contiguous within each LUN), because the extent generally does not maintain information with respect to its presence (i.e., logical address) in the storage pool of the cluster 100.

In an embodiment, a random technique, such as a hash function 620, may be applied to each extent 610 to generate an extent hash value (hash value 650) that is used to distribute the write data (i.e., extent data) and associated metadata substantially evenly among the nodes 200 to enable fine-grain scale out and de-duplication 452 in the cluster 100. The hash computation is performed on the entire extent and may be computed any time before the extent is passed to an extent store instance. Illustratively, the resulting hash value 650 may be used for two generally similar tasks. The first task is to distribute (spread) the extents and associated metadata evenly among extent store instances on the nodes of the cluster, while the second task is to spread the extents and associated metadata evenly within each extent store instance. Thus, the hash value 650 is illustratively computed at the persistence layer 330, but may be computed at or before the volume layer 340 because the volume layer needs the hash value to determine the extent store instance of a node that services the extent. To that end, the persistence layer 330 illustratively contains computer executable instructions executed by the CPU 210 to perform operations that implement the extent hashing technique 600 described herein.

Computation of the hash value 650 at the persistence layer 330 is further desirable to optimize data flow for the write request associated with the extent. In an embodiment including the function shipping implementation, the extent 610 is not passed to the extent store layer 350 until the write request has passed through the volume layer 340. To avoid potential routing of the write data through an extra "hop" (e.g., through a volume layer instance of a node that is different from the node of the extent store instance having the appropriate bucket to store the extent), the hash computation, i.e., extent hash function 620 (and bucket mapping function 700), are illustratively performed at the persistence layer 330 so that it can be determined where to send the extent to be stored, i.e., to the appropriate extent store instance 720.

The hash computation is illustratively performed in accordance with a secure hash algorithm, e.g., SHA-2, BMW or ECHO cryptographic hash function, to generate a 256-bit extent hash. Alternatively, hash algorithms such as SipHash (secure 64-bit) or CityHash (non-cryptographic 64-bit) may be used. Selection of the secure hash function may involve trading-off the hash computation cost and (i) collision resistance and/or (ii) cryptographic strength. For example, the ECHO hash function provides enhanced uniformity of distribution and security, but is expensive in terms of computation (i.e., multiple cycles per byte). However, the chances of a collision on the 256-bit hash result are negligible, which facilitates less expensive rendering of de-duplication 452. On the other hand, a smaller hash (i.e., CityHash or SipHash) may be faster to compute, but may result in more frequent collisions requiring more expensive de-duplication 452.

In order to further enhance security (i.e., reduce attack by data of I/O requests intended to manipulate the hash computation), the hash function 620 may be employed with a secret value for the entire cluster 100. The secret value, which is random and possibly unique for the cluster, may be inserted into the hash function computation of the extent hash to thwart any attack on the distribution of the data within the cluster 100. For example, the attack may compute potential extents and discard all of them except the extents that collide in a portion of the hash tables 850. By employing the hash function with dissimilar secret values among clusters, a different (and possibly unique) hash function 620 may be provided to the nodes 200 of the cluster 100 to thwart such an attack.

A portion, e.g., the lower 48 bits, of the result of the 256-bit (or 64-bit) hash function 620 may be illustratively trimmed in accordance with a trim technique 640, to generate a hash value 650 of a trimmed size, e.g., 48-bits. It will be apparent to those skilled in the art that the trimmed size of the hash value may be enlarged as the storage capacity of the cluster increases. In an embodiment, the trim technique 640 essentially truncates or severs the 6-byte (48-bit) portion of the hash value 650 from the 32-byte (256-bit) hash function result. The 6 bytes (48 bits) of the hash value 650 are illustratively sufficient to enable the extent store instance to find a representation of the location of the extent 610 on SSD 260 via entries in the hash tables 850. It should be noted that the hash value is selected to be large relative to the anticipated number of extents in the storage container (i.e., the extent key space) to, inter alia, reduce extent key collisions during write operations. For example, assuming a key space with $2^{48}$ values to containing roughly $2^{38}$ extent keys, a collision rate of roughly $2^{-10}$ or 0.1% at capacity is implied. In addition, the hash value 650 illustratively enables its associated metadata (e.g., extent metadata in entries of the hash tables 850) to reside entirely in memory 220. The hash value 650 may be used to perform address-like determinations within portions of its hash space in accordance with various techniques, such as bucket mapping 700 and extent metadata selection 800 within the storage I/O stack 300, to select the appropriate hash table 850a for the extent 610.

Figure 7:
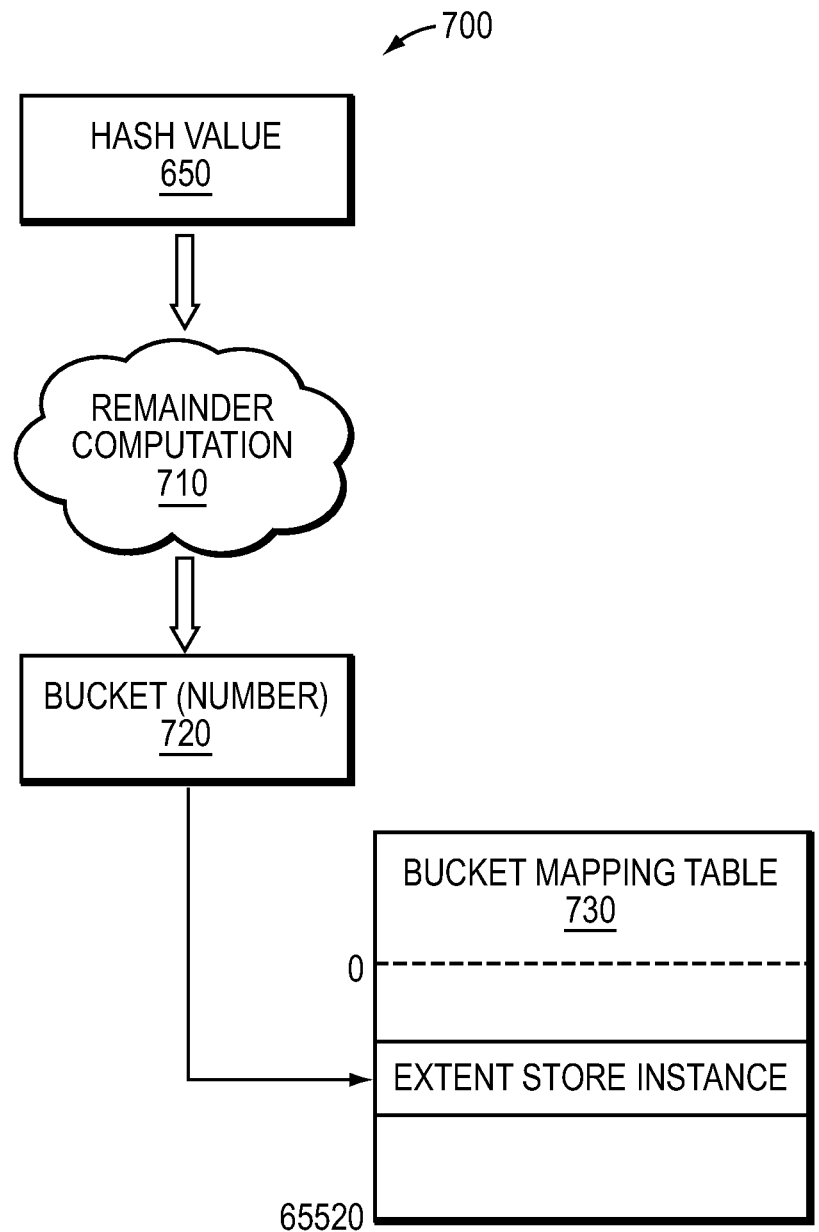
FIG. 7 is a block diagram of a bucket mapping technique.

FIG. 7 is a block diagram of the bucket mapping technique 700 that may be advantageously used with one or more embodiments described herein. As noted, the hash value 650 may be computed at the persistence layer 330 so as to enable efficient distribution of the extents 610 and associated extent metadata evenly throughout the nodes 200 of the cluster. In an embodiment, the mapping technique divides (e.g., substantially evenly) the hash space of the 48-bit hash value (i.e., $2^{48}$) into buckets that, collectively, are representative of the extents and associated extent metadata. A substantially equal number of buckets may then be assigned or mapped to each extent store instance of the nodes in the cluster 100 to thereby distribute ownership of the buckets, and thus the extents and extent metadata, substantially evenly, i.e., approximately uniformly, across all of the extent store instances 720 of the nodes 200. Notably, the buckets may be alternatively assigned (or reassigned) by weighted distribution according to characteristics of the nodes such as storage capacity and performance.

In an embodiment, the bucket mapping technique maps the hash value to extent store instances using a remainder computation 710 based on modulus arithmetic: the remainder of the hash value divided by (modulo) the number of buckets, e.g., [hash value] mod [number of buckets]. Illustratively, the number of buckets (i.e., the divisor) is a prime, e.g., 65521 (the largest prime less than $2^{16}$), although those skilled in the art will recognize that other divisors may be used in accordance with the embodiments described herein. Notably, it is desirable that the divisor (i.e., the remainder computation) be relatively prime to computations used within the extent store layer to distribute metadata, wherein relative primes denote two numbers with no common divisor. An example of relatively prime computations may be 255×257 (65,535) and 13. The results of the remainder computation may be organized as a data structure, such as a bucket mapping table 730, having 65521 bucket number entries, each of which maps to (references) an extent store instance. Alternatively, a bucket mapping data structure in the cluster database 244 may be used to associate a bucket (number), e.g. 0-65520, to an extent store instance 720 or node 200.

The buckets may be continually mapped to extent store instances 720 and, as new extents 610 are formed, they may be assigned to the buckets. The mappings from bucket numbers to extent store instances of the nodes are essentially arbitrary; a requirement may be that the number of buckets served by each extent store instance is proportional to the storage capacity and processing bandwidth available in each node 200. The buckets 720 may be distributed across the extent store instances to thereby achieve a substantially even and balanced level of capacity as well as bandwidth utilization across all of the nodes in the cluster 100.

A new extent 610 may be subsequently formed at a node and applied to the hash function 620 to generate a result which may be trimmed (e.g., by trim technique 640) to produce a hash value 650 to select the extent store instance 720 for storing the new extent 610. The hash value 650 may then be processed by the remainder computation 710 that divides the hash value by the number of buckets, e.g., [hash value] mod [number of buckets], wherein the number of buckets is illustratively a prime, e.g., 65521. The result of the computation generates a bucket number associated with a bucket that functions as an index into a selected entry of the bucket mapping table 730 to identify an extent store instance 720 that serves the new extent associated with the hash value 650. Alternatively, the bucket mapping data structure of the cluster database 244 may be searched using the bucket to identify an associated extent store instance 720 or node 200. The hash value 650 may thereafter be passed to the extent store instance 720 to enable selection of extent metadata used to identify a location 830 of the extent on SSD 260.

Figure 8:
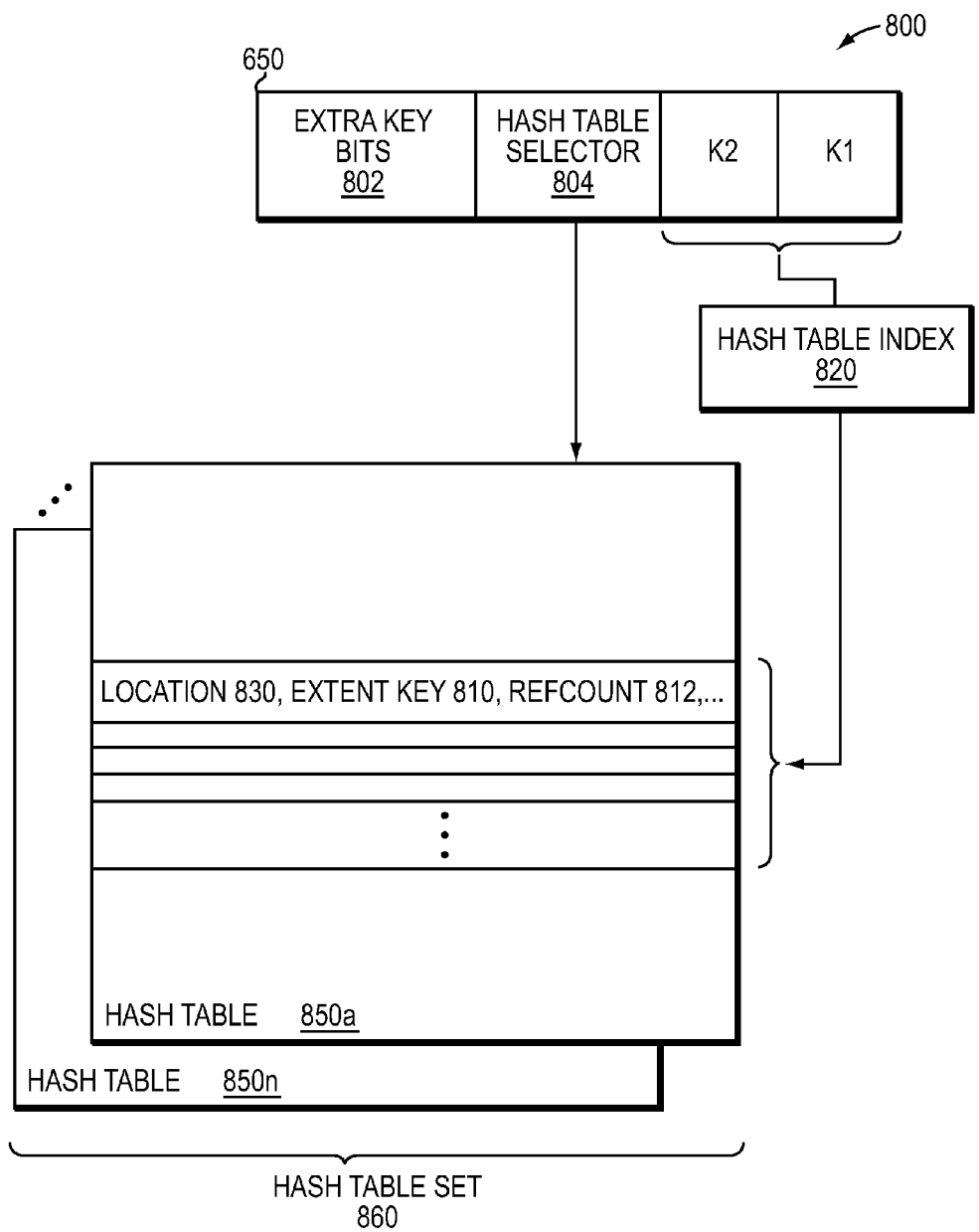
FIG. 8 is a block diagram of an extent metadata selection technique.

FIG. 8 is a block diagram of the extent metadata selection technique 800 that is illustratively performed at the extent store instance. In an embodiment, the extent metadata resides entirely in the memory 220 of each node 200 and is embodied as a hash table set 860 of hash tables 850a-n configured to address locations of the SSDs 260. Note that the bucket mapping technique 700 ensures that the buckets assigned to the extent store instances are substantially evenly populated with extent metadata such that each bucket contributes equally to the hash tables 850 served by an extent store instance. The extent store instance may use the hash value 650 to provide the extent metadata selection function that exploits independent groups of bits from that value. To that end, the contents of the 48-bit hash value 650 are illustratively organized into the following fields: an 8-bit field used for, inter alia, bucket selection and hash table selection ("extra key bits" 802), an 8-bit field used to select a hash table from the set of hash tables ("hash table selector" 804), and two 16-bit fields used as indexes into the selected hash table ("K2" and "K1").

In an embodiment, there are illustratively 768 hash tables in the hash table set 860, wherein each hash table 850 has a same size, e.g., approximately 4 million entries. Illustratively, the number of hash tables may be determined by multiplying the 8 bits of the hash table selector ($2^8$ or 256) by a prime (3) such that 256×3=768. Note that if more than 768 tables are needed, then the multiplier to 256 may be a prime that is larger than 3, e.g., 5×256 equaling 1280 tables. The randomness, i.e., approximately uniform distribution, of the 48-bit hash value 650 may be relied upon to spread the metadata evenly among the hash tables 850.

The hash table selector 804 may thereafter be used to select an appropriate in-core hash table 850 having an extent key 810 that is used to map to a SSD location to determine whether the extent 610 is presently served by the selected extent store instance. Illustratively, the appropriate hash table 850 is selected by dividing (modulo) the entire 48-bit hash value 650 by a prime divisor, e.g., 3, to generate a remainder (between 0-2) and multiplying the 8-bit value of the hash table selector by 3 to generate a value that is is then added to the remainder, i.e., 3×[hash table selector 804]+[hash value 650] mod 3. It should be noted that, in general, the 48-bit hash value 650 may be overloaded with prime divisors to obtain various hash table indices to address varying amounts of hash tables 850. The 768 hash tables represent a number of tables that can reasonably fit in memory 220.

Once a hash table 850 is selected, the extent store instance may extract K1 and K2 of the hash value 650, and use either K1 or K2 as a hash table index 820 to index into the hash table 850 and select an appropriate entry configured to store, inter alia, the extent key 810, as well as an identification of location 830 on SSD. If it is determined that the extent key 810 associated with the hash table index 820 (e.g., K1) is not present, then the other of K1 and K2 (e.g., K2) is used as the hash table index 820. If it is determined that the extent key 810 associated with the hash table index 820 (e.g., K2) is present in the hash table, an existing extent previously stored on SSD 260 may be retrieved from location 830 and its data contents may be compared with the contents of the newly formed extent to determine whether their data is identical. If the data is not identical, a collision occurs and a technique may be invoked that generates a new candidate extent key for the newly formed extent and that illustratively resides in the same bucket. The new candidate extent key is then used to index into the hash table 850 (or any other table in the hash table set 860) to select another appropriate entry configured to store that extent key. If the data is the same, the newly formed extent already exists on SSD and de-duplication 452 may be performed in-line to obviate storage of another copy of the data. Thereafter, a reference count (ref count 812) in the hash table entry for the existing extent is incremented.

Figure 9:
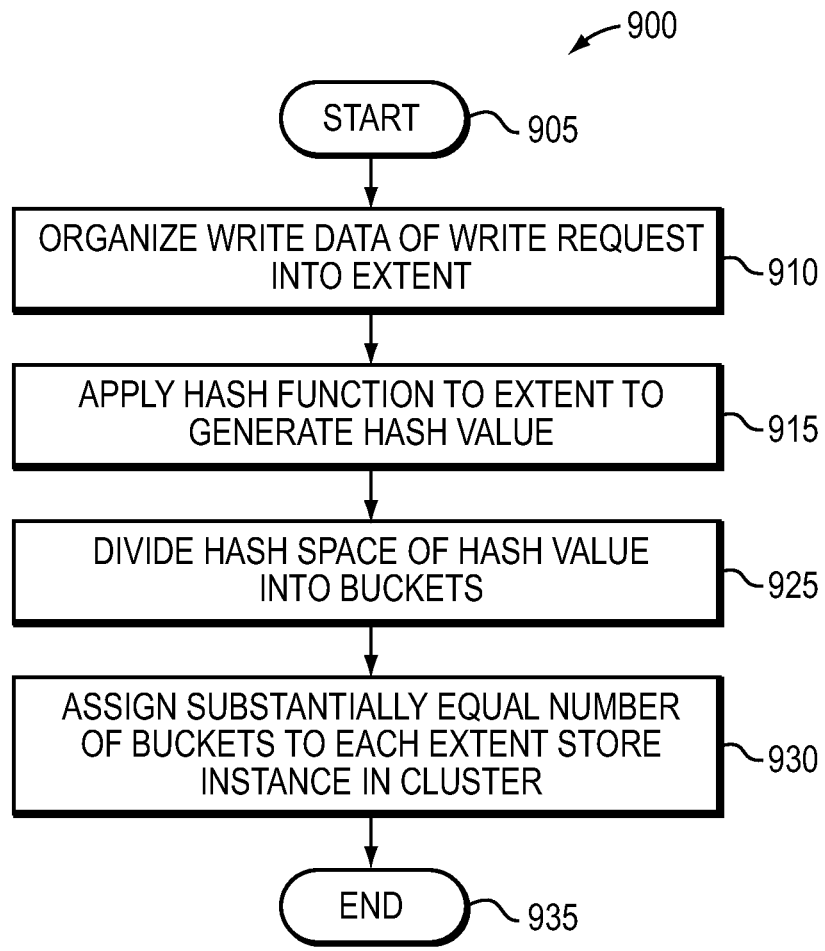
FIG. 9 is an example simplified procedure for distributing data and associated metadata evenly among the nodes of the cluster.

FIG. 9 is an example simplified procedure for distributing data and associated metadata evenly among nodes of a cluster. The procedure 900 starts at step 905 and proceeds to step 910 where write data of one or more write requests received at a node of the cluster is organized into one or more extents. At step 915, a hash function (followed by a trim technique) is applied to each extent to generate a hash value. At step 925, a hash space of the hash value is divided into a number of buckets representative of the extents and associated extent metadata. At step 930, a substantially equal number of buckets is assigned to each extent store instance in the cluster to thereby distribute ownership of the buckets, and thus the extents and extent metadata, substantially evenly across all of the extent store instances of the nodes. The procedure then ends at step 935.

While there have been shown and described illustrative embodiments for providing an extent hashing technique that is used to distribute data and associated metadata substantially evenly, i.e., approximately uniformly, among the nodes of a cluster, it is to be understood that various other adaptations and modifications may be made within the spirit and scope of the embodiments herein. For example, embodiments have been shown and described herein with relation to a bucket mapping technique that substantially evenly distributes extents and associated extent metadata across all of the extent store instances of the nodes. However, the embodiments in their broader sense are not so limited, and may, in fact, allow efficient redistribution of buckets in the event that one or more nodes are added to or deleted from the cluster 100.

For instance, assume one or more new node "members" are added to the cluster. A determination may be rendered as to the number of the buckets to migrate from existing extent store instance members of the cluster in order to populate the new cluster members with an equal (or roughly equal) number of buckets. Because the distribution of extent metadata with the hash tables is derived from the relatively prime computation described above, when a bucket is relocated to another node 200, no fraction of the hash tables 850 need be relocated, i.e., moved to another bucket, as there is no need to redistribute contents to get an even distribution. The determined number of buckets may then be arbitrarily selected from each existing member so as to move a substantially equal number of buckets with a substantially equal amount of data required. For example, if the additional nodes result in 100 nodes in the cluster, 79 of them may have 655 buckets and 21 may have 656, i.e., 79×655+21×656=65521 buckets.

Advantageously, the hash value 650 described herein may be used ("overloaded") for multiple different purposes within the context of the distributed storage architecture, e.g., a remainder computation 710 on the hash value 650 selects buckets, a hash table selector 804 of the hash value 650 selects a hash table 850, and a hash table index 820 computed from the hash value 650 selects an entry of the selected hash table 850. To achieve such overloading, relatively prime divisors applied to the hash value, as well as extracted independent bit fields from the hash value may be used. The hash value 650 is illustratively computed by a hash function 620 having good avalanche properties, i.e., good block data randomization. For example, the hash function should have the properties that changes to or swapping of any bits of the extent 610 to which the hash function is applied results in each bit independently having the same chance of changing in the hash value (and which bits change should not be the same each time). In addition, the hash function 620 should have good distribution properties to ensure the entries of the hash tables 850 are substantially balanced and substantially evenly accessed, i.e., no hot spots.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   organizing write data of write requests into one or more extents, wherein each extent is a block of data that provides a unit of storage on one or more storage devices of a cluster, the write requests processed at a node of the cluster, the cluster having a plurality of nodes;
   applying a hash function to each extent to generate a hash value;
   dividing a hash space of the hash value into a plurality of buckets representative of the one or more extents and associated extent metadata, a number of the buckets being less than a number of values in the hash space; and
   assigning the buckets to extent store instances of the nodes in the cluster based on results of a remainder computation, wherein the remainder computation divides a remainder of the hash value of each extent by the number of buckets using modulo arithmetic, and the results of the remainder calculation are bucket numbers that operate as indexes in a bucket mapping data structure having bucket number entries, wherein each bucket number entry maps to an extent store instance.

2. The method of claim 1 wherein the number of buckets is relatively prime to a number used in a metadata selection computation by each extent store instance, wherein relatively prime denotes a lack of a common divisor.

3. The method of claim 1 wherein the number of buckets is a prime number.

4. The method of claim 1 wherein applying the hash function comprises inserting a secret value into the hash function.

5. The method of claim 1 wherein dividing the hash space of the hash value comprises dividing the hash value by the number of buckets, wherein the number of buckets is a prime number.

6. The method of claim 1 further comprising:
   overloading the hash value for multiple different purposes within a context of a distributed storage architecture.

7. A method comprising:
   forming an extent at a node of a cluster having a plurality of nodes, wherein the extent is a block of data that provides a unit of storage on one or more storage devices of the cluster;
   applying a hash function to the extent to generate a hash value;
   processing the hash value using a remainder computation to generate a bucket number of a bucket that includes a portion of a hash space of the hash function, wherein the remainder computation divides a remainder of the hash value by a number of buckets using modulo arithmetic; and
   indexing into a selected entry of a bucket mapping data structure having bucket number entries using the bucket number, each bucket number entry mapping to an extent store instance, the indexing to identify an extent store instance of the node that serves the extent.

8. The method of claim 7 further comprising:
   passing the hash value to the identified extent store instance to enable selection of extent metadata used to identify a location of the extent on a storage device of the one or more storage devices of the cluster.

9. The method of claim 8 further comprising:
   using a first field of the hash value to select a hash table storing an extent key that is used to map to the location on the storage device.

10. The method of claim 9 wherein using the first field comprises using a hash table index field of the hash value.

11. The method of claim 9 further comprising:
using a second field of the hash value to index into the selected hash table to select an entry configured to store an identification of the location on the storage device.

12. The method of claim 11 wherein the entry is not found, using a third field of the hash value to index into the selected hash table.

13. The method of claim 7 wherein the number of buckets is a prime number.

14. A system comprising:
a central processing unit (CPU) of a node of a cluster having a plurality of nodes; and
a memory coupled to the CPU and configured to store one or more processes executable by the CPU, the one or more processes when executed operable to:
organize write data of write requests into one or more extents, an extent being a block of data that provides a unit of storage on one or more storage devices of the cluster;
apply a hash function to each extent to generate a hash value;
divide a hash space of the hash value into a plurality of buckets representative of the one or more extents and associated extent metadata, a number of the buckets being less than a number of values in the hash space; and
assign the buckets to extent store instances of the nodes in the cluster to thereby distribute ownership of the buckets across the extent store instances of the nodes, the assignment of buckets based on a remainder computation that divides a remainder of the hash value of each extent by the number of buckets using modulo arithmetic to generate bucket numbers, the bucket numbers used as indexes in a bucket mapping data structure having bucket number entries, wherein each bucket number entry maps to an extent store instance.

15. The system of claim 14 wherein the one or more storage devices are solid state drives (SSDs).

16. The system of claim 15 wherein the SSDs are flash storage devices.

17. A method comprising:
organizing write data of write requests into one or more extents, wherein each extent is a block of data that provides a unit of storage on one or more storage devices of a cluster, the write requests processed at a node of the cluster, the cluster having a plurality of nodes;
applying a hash function to each extent to generate a hash value;
dividing a hash space of the hash value into a plurality of buckets, a number of the buckets being less than a number of values in the hash space;
assigning the buckets to extent store instances of the nodes in the cluster by
performing a remainder computation, wherein the remainder computation divides a remainder of the hash value of each extent by the number of buckets using modulo arithmetic to generate bucket numbers, and
using the bucket numbers as indexes in a bucket mapping data structure having bucket number entries, wherein each bucket number entry maps to an extent store instance.

18. The method of claim 17, wherein the number of buckets is relatively prime to a number used in a metadata selection computation by each extent store instance, wherein relatively prime denotes a lack of a common divisor.

19. The method of claim 17, wherein applying the hash function comprises inserting a secret value into the hash function, wherein the secret value is a random value that is unique to the cluster.

* * * * *

UNITED STATES PATENT AND TRADEMARK OFFICE
CERTIFICATE OF CORRECTION

| | | |
|---|---|---|
| PATENT NO. | : 8,996,535 B1 | Page 1 of 1 |
| APPLICATION NO. | : 14/160048 | |
| DATED | : March 31, 2015 | |
| INVENTOR(S) | : Jeffrey S. Kimmel et al. | |

It is certified that error appears in the above-identified patent and that said Letters Patent is hereby corrected as shown below:

In the Specification:
col. 14, line 18 should read:
table selector by 3 to generate a value that is then added to Signed and Sealed this
Twenty-first Day of July, 2015

Michelle K. Lee
*Director of the United States Patent and Trademark Office*